No. 769,333. PATENTED SEPT. 6, 1904.
R. P. AUBREY.
DOUBLE LOGGING HOOK.
APPLICATION FILED JULY 30, 1901.
NO MODEL.
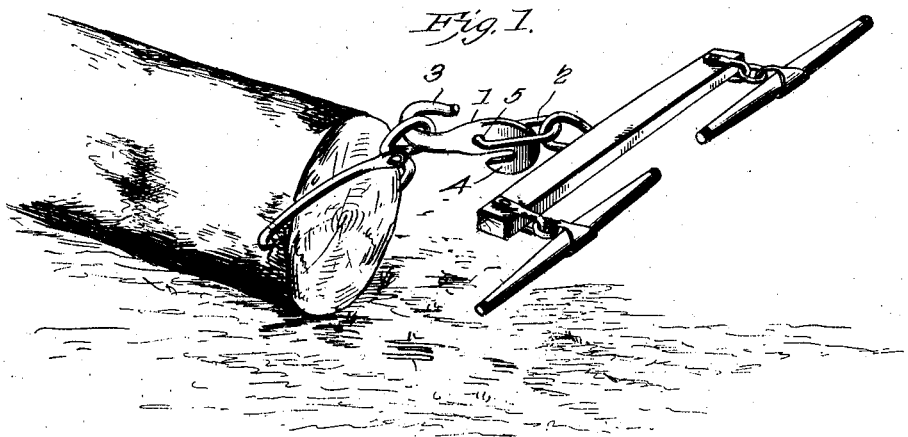
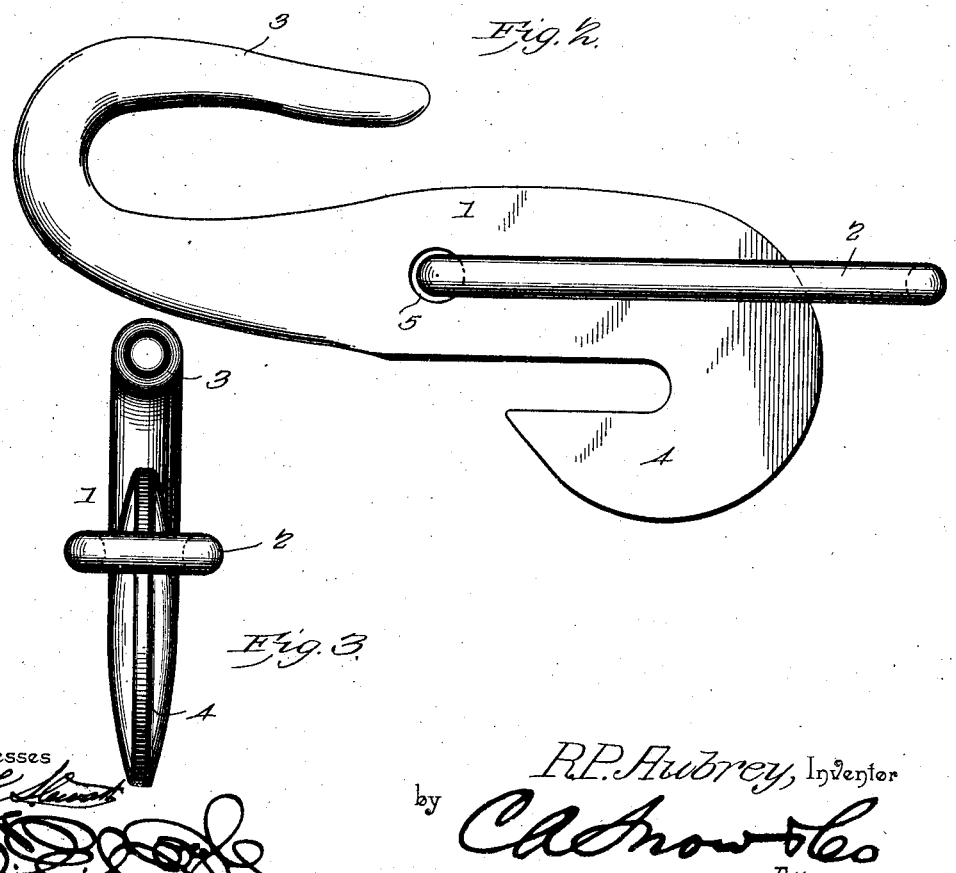

No. 769,333. Patented September 6, 1904.

UNITED STATES PATENT OFFICE.

RUFUS P. AUBREY, OF HAYNESVILLE, LOUISIANA.

DOUBLE LOGGING-HOOK.

SPECIFICATION forming part of Letters Patent No. 769,333, dated September 6, 1904.

Application filed July 30, 1901. Serial No. 70,295. (No model.)

*To all whom it may concern:*

Be it known that I, RUFUS P. AUBREY, a citizen of the United States, residing at Haynesville, in the parish of Claiborne and State of Louisiana, have invented a new and useful Double Logging-Hook, of which the following is a specification.

My invention relates to a double logging-hook designed for interchangeable use in "snaking" or bringing logs to the logging-wagon and in supporting the logs on the wagon; and the object in view is to provide the hook with means for enabling it to perform both functions without the disadvantages incident to disengaging and reëngaging the same preparatory to connecting the same with the wagon-windlass and without the disadvantage incident to the catching of the hook in adjacent objects during the snaking operation.

Further objects and advantages of the invention will appear in the following description, when considered in connection with the accompanying drawings, wherein similar reference characters represent corresponding parts in all the figures, and the novel features thereof will be particularly pointed out in the appended claim, it being understood that various changes in the form, proportion, size, and minor details of construction may be resorted to without departing from the spirit or sacrificing any of the advantages of the invention.

In the drawings, Figure 1 is a perspective view of a double logging-hook constructed in accordance with the invention shown in the operative position. Fig. 2 is a detail side view of the hook. Fig. 3 is an end view of the same.

The device embodying the invention consists of a double-ended hook or a hook wherein the body portion or shank 1 is extended in both directions from the point of attachment of the link 2 to form an open hook 3 and a grab-hook 4, the sides of the throat of said grab-hook being approximately parallel and the outer contour of the grab-hook end of the device being convexly rounded to adapt the hook to pass adjacent objects without engagement therewith. The length of the clevis or link 2 is greater than the length of the double hook from the eye or opening 5 to either of the ends, so that either hook end may pass through the link, and the eye or opening is nearer to the grab-hook end of the device than to the open-hook end, while the grab-hook end is much heavier than the opposite end for a purpose hereinafter described.

A hook constructed in accordance with my invention is more readily adjusted to the log when the latter is to be loaded on the wagon, and, moreover, by the use of the hook as described the time and labor incident to making the usual half-hitch now used in connection with loading logging-wagons is avoided. The open hook is used in bringing the logs to the wagon, or, in other words, during the snaking operation, and the grab-hook is used in loading upon the wagon. It is obvious that draft-animals may be used in connection with this hook, as in the ordinary practice. Time is saved, particularly in loading on the wagon, by means of the hook embodying my invention.

A further advantage of the device herein described resides in the fact that as the hook ends are adapted to pass through the link in either snaking or loading it is possible to maintain the hook in an upright position or with its width in an approximately vertical plane, which prevents the hook from catching on adjacent objects—a disadvantage of the ordinary forms of hooks and other devices for this purpose. This feature of the hook is due to the fact that the wider grab-hook end is much heavier than the open-hook end, and the eye or opening is also nearer to the grab than to the open hook end of the device, so that it maintains its position by gravity.

In the ordinary practice it is usual to use a grab for engagement with the log, such a device being shown in Fig. 1 of the drawings, and with the ring of this grab is engaged, preferably, the open hook 3, thus disposing the grab-hook 4 forwardly and offering no projections to catch in the branches of trees or undergrowth in dragging the log endwise therethrough. It is also usual in loading to use a skid or a pair of skid-bars inclined upward from the ground to the level of the wagon-body and to carry a drag-chain from the wagon-body around the log and thence backward over the wagon for the attachment of draft-horses. Therefore after the team has been used to drag the log to a point near the wagon or into the open or clearing, the open hook being engaged with the grab in this work, the said open hook may be detached from the grab and the double hook reversed, so as to bring the grab-hook into engagement with one of the links of the chain by which the log is to be rolled up the skid-bars to the wagon. Ordinarily in this use a half-hitch is made in the chain to prevent the latter from slipping; but the parallel-throated grab-hook forming one of the elements of my double hook serves to maintain engagement with the chain without liability to slipping.

Having described my invention, what I claim is—

An S-shaped logging-hook having two bills, one forming an open hook, and the other a grab-hook, the grab-hook end being wider and heavier than the open-hook end, there being a link-receiving opening formed in the shank of the hook at a point intermediate of its length, but nearer to the grab-hook end than to the open-hook end, and a link disposed within the opening and of a length greater than the distance between the opening and the longer end of the hook, the unequally-distributed weight of the hook serving to maintain it in an approximately vertical position by gravity, and both hook members being movable to engaging position for employment of either or both ends of the hook.

In testimony that I claim the foregoing as my own I have hereto affixed my signature in the presence of two witnesses.

RUFUS P. AUBREY.

Witnesses:
 S. C. WALLER,
 R. P. DAWSON.